United States Patent
Jokinen et al.

(10) Patent No.: US 7,769,633 B2
(45) Date of Patent: *Aug. 3, 2010

(54) REAL-TIME WIRELESS E-COUPON (PROMOTION) DEFINITION BASED ON AVAILABLE SEGMENT

(75) Inventors: Jukka V. Jokinen, Helsinki (FI); Lioudmila Blants, Espoo (FI); Risto Pitkanen, Tampere (FI); Sami Pienimaki, Tampere (FI); Jouka Mattila, Tampere (FI); Riku Suomela, Tampere (FI)

(73) Assignee: Nokia Corporation, Espoo (FI)

( * ) Notice: Subject to any disclaimer, the term of this patent is extended or adjusted under 35 U.S.C. 154(b) by 179 days.

This patent is subject to a terminal disclaimer.

(21) Appl. No.: 12/017,958

(22) Filed: Jan. 22, 2008

(65) Prior Publication Data

US 2008/0120186 A1 May 22, 2008

Related U.S. Application Data

(63) Continuation of application No. 09/764,709, filed on Jan. 18, 2001, now Pat. No. 7,343,317.

(51) Int. Cl.
G06Q 30/00 (2006.01)

(52) U.S. Cl. .................. 705/14.4; 705/14.1; 705/14.48; 705/26; 705/27; 370/328; 379/114; 455/405; 455/456.3; 455/414

(58) Field of Classification Search ................ 705/14.4, 705/14.1, 14.48, 26, 27; 370/328; 455/405, 455/414, 456.3; 379/114
See application file for complete search history.

(56) References Cited

U.S. PATENT DOCUMENTS

| | | | | | |
|---|---|---|---|---|---|
| 4,674,041 | A | * | 6/1987 | Lemon et al. | ................. 705/14 |
| 5,539,395 | A | * | 7/1996 | Buss et al. | ................. 340/7.43 |
| 5,870,030 | A | * | 2/1999 | DeLuca et al. | ............. 340/7.48 |
| 5,889,852 | A | * | 3/1999 | Rosecrans et al. | ...... 379/355.05 |
| 6,052,591 | A | * | 4/2000 | Bhatia | ........................ 455/445 |
| 6,252,544 | B1 | * | 6/2001 | Hoffberg | ................. 342/357.1 |
| 6,332,127 | B1 | * | 12/2001 | Bandera et al. | ............... 705/14 |
| 6,450,407 | B1 | * | 9/2002 | Freeman et al. | ............. 235/492 |

(Continued)

FOREIGN PATENT DOCUMENTS

| WO | WO 9615614 A1 | * | 5/1996 |
|---|---|---|---|
| WO | WO 9722066 A1 | * | 6/1997 |

*Primary Examiner*—Jean D. Janvier
(74) *Attorney, Agent, or Firm*—Ditthavong Mori & Steiner, P.C.

(57) ABSTRACT

Advertising messages are provided to mobile terminals of those users identified by user information as meeting certain criteria, such as users fitting particular user profiles and/or users located in a particular desired location. The content of the advertising messages is dynamically generated based on the number of mobile terminals to whom the advertising message is to be sent and the advertising message is sent to the identified mobile terminals over a mobile network or a short range communication signal. In the latter case, location information may be sent to the mobile terminal along with an advertising message. Where the content of an advertising message comprises an electronic coupon, the value of the coupon depends on the number of mobile terminals to whom the advertising message is to be sent. A mobile terminal user can redeem an electronic coupon by transmitting it from his mobile terminal to a coupon redemption terminal.

24 Claims, 13 Drawing Sheets

U.S. PATENT DOCUMENTS

| | | | |
|---|---|---|---|
| 6,529,159 B1 * | 3/2003 | Fan et al. | 342/357.09 |
| 6,597,903 B1 * | 7/2003 | Dahm et al. | 455/405 |
| 6,647,269 B2 * | 11/2003 | Hendrey et al. | 455/456.3 |
| 6,681,114 B2 * | 1/2004 | Chang et al. | 455/456.3 |
| 7,257,545 B1 * | 8/2007 | Hung | 705/14.26 |

* cited by examiner

106 — AMOUNT OF VISITORS          50

107 — DO YOU WANT TO SEND AN E-COUPON?    _ YES  _ NO

108 — WHAT IS THE OFFER?          _ $5.00 BIG LUNCH

109 — TIME LIMIT                  _ BEFORE 11:00 A.M.

CENTRAL REGISTER — 130

| COMPANY NAME (132) | LOCATION (134) | ADVERTISEMENT (136) | AMOUNT OF VISITORS (138) |
|---|---|---|---|
| 1. COMPANY NO.1 | CELL ID. NO. 560 | XXX | 100 |
| 2. COMPANY NO. 1 | CELL ID. NO 720 | YYY | 10 |
| 3. COMPANY NO. 2 | CELL ID. 1055 | ZZZ | 1000 |
| 4. COMPANY NO. 3 | CELL ID. NO. 1000 | VVV | 55 |
| 5. COMPANY NO. 4 | YPS 22' 15", 29' 15" | AAA | 5 |
| 6. COMPANY NO. 5 | BT NO. 565 | DDDD | 25 |

CRITERIA DATABASE — 170

| CRITERIA REGISTER | CUSTOMERS | PRICE |
|---|---|---|
| CRITERIA # 1 | 0-100<br>101-500<br>501-... | 0.3 $<br>0.4 $<br>0.5 $ |
| CRITERIA # 2 | 0-100<br>101-500<br>501-... | 0.3 $<br>0.4 $<br>0.5 $ |

*FIG. 12A*

ADVERTISER PRICING DATABASE — 180

| ADVERTISER | AD ID | NO. OF CUSTOMERS MEETING CRITERIA | PRICE |
|---|---|---|---|
| RESTAURANT 1<br>... | 5134 | 280 | 112 |
| PIZZA SHOP<br>... | 5136 | 800 | 400 |
| RESTAURANT 2 | 5138 | 85 | 34 |

*FIG. 12B*

REAL-TIME WIRELESS E-COUPON (PROMOTION) DEFINITION BASED ON AVAILABLE SEGMENT

This application is a continuation of prior U.S. patent application Ser. No. 09/764,709, filed on Jan. 18, 2001, the entire disclosure of which is herein incorporated by reference.

FIELD OF THE INVENTION

This invention relates to the distribution of messages and more precisely to the distribution of information or advertising messages to mobile terminals.

DESCRIPTION OF THE RELATED ART

A business or other entity, which may be termed an advertising entity (advertiser), often offers some form of special values or discounts in an advertising message (advertisement) to entice potential consumers to purchase goods and/or services. These discounts are often distributed to consumers in the form of redeemable coupons, conventionally in a paper format. More recently, prior art systems and methods have been devised for distributing coupons electronically. Some services make coupons available on the Internet. A user may then retrieve one or more of the coupons from a web site and may print the retrieved coupons on his printer. In a variation of this system described in U.S. Pat. No. 5,761,648, coupons are electronically distributed, rather than retrieved from a web site, and printed on a printer. In yet another system, such as the system described in U.S. Pat. No. 5,710,886, coupons are distributed on a diskette and printed at home.

The advertising entity may wish to generate the content of an advertising message that is transmitted to mobile terminal users dynamically depending on the number of registered mobile terminal users that are in the vicinity of the advertising entity's premises. One reason for this is to be able to distribute the electronic coupons ("e-coupons"), which herein includes any promotional message or special offer that offers potential customers discounts or other promotions, where the monetary value of the coupon or the promotional message that is distributed will vary depending on the number of registered mobile terminal users that are in the vicinity of the advertising entity's premises. The controlling of the distribution of e-coupons and other promotional messages to mobile terminal users gives advertisers and advertising entities a method of effectively controlling the advertising costs. It would be advantageous to provide a system and method to perform this function.

In addition to obtaining discounts, mobile terminals users often wish to know their location. A global positioning system (GPS) may be incorporated for this purpose into a mobile terminal. However, the GPS may not function properly especially in cities where tall buildings may interfere with the necessary signals. It would therefore also be advantageous to provide a way for mobile terminal users to be able to obtain location information at their mobile terminals where GPS signals are unavailable.

Commonly-owned U.S. patent application Ser. No. 09/471,875, filed Dec. 23, 1999, entitled Method and Apparatus for Providing Precise Location Information Through a Communications Network describes a method and apparatus for a user to ascertain his geographic location using his mobile terminal. Such information can be used to locate, for example, nearby business establishments, like a gas or automotive repair station. It would be advantageous to be able to use such terminal location information to send a mobile terminal user advertising messages for these nearby establishments/advertising entities, including electronic coupons for discounts or other promotions to be used at these nearby establishments.

SUMMARY OF THE INVENTION

To overcome limitations in the prior art described above, and to overcome other limitations that will become apparent upon reading and understanding the present specification, the present invention discloses a system, apparatus and method for communicating services to a wireless terminal operating within a wireless network. The wireless device is not limited to any present navigation structure, and provides the ability to remotely access services.

It is therefore an object of the present invention to provide a method of dynamically pricing and/or generating an advertising message to be sent to at least one of a plurality of mobile terminal users. The method comprises:
- (a) selecting at least one of a plurality of mobile terminals using at least one criteria;
- (b) maintaining information about the at least one of a plurality of mobile terminal users matching the at least one criteria;
- (c) creating an advertising message to be sent to the selected at least one of a plurality of mobile terminals, the advertising message including content dynamically generated based on a number of mobile terminals selected using the at least one criteria to receive the advertising message;
- (d) defining a price of the advertising message based on the number of the at least one of mobile terminal users matching the at least one criteria;
- (e) distributing the advertising message to the at least one of a plurality of mobile terminal users matching the at least one criteria; and
- (f) debiting a service user the price of the advertising message distributed to the at least one of a plurality of mobile terminal users matching the at least one criteria.

It is another object of the present invention to provide a method of dynamically generating an advertising message sent to mobile terminal users. The method comprises selecting at least one of a plurality of mobile terminals using at least one specific criterion, and creating an advertising message to be sent to the selected at least one of a plurality of mobile terminals, the advertising message including content dynamically generated based on a number of mobile terminals selected using the at least one specific criterion to receive the advertising message.

It is another object of the present invention to provide a method of dynamically pricing an advertising message sent to at least one of a plurality of mobile terminal users. The method comprises maintaining information about at least one of a plurality of mobile terminal users matching at least one criterion, defining a price of the advertising message based on the number of the at least one of mobile terminal users matching the at least one criterion, distributing the advertising message to the at least one of a plurality of mobile terminal users matching the at least one criterion, and debiting a service user the price of the advertising message distributed to the at least one of a plurality of mobile terminal users matching the at least one criterion.

It is another object of the present invention to provide a system of dynamically pricing and/or generating an advertising message to be sent to at least one of a plurality of mobile terminals. The system comprises at least one of a plurality of mobile terminals, a network with which the at least one of a plurality of mobile terminals communicates, and a server communicating with the network. The server comprises means for selecting at least one of a plurality of mobile terminals using at least one criterion, means for maintaining information of at least one of a plurality of mobile terminal users matching the at least one criterion, means for creating an advertising message to be sent to the selected at least one of a plurality of mobile terminals, the advertising message including content dynamically generated based on a number of mobile terminals selected using the at least one criterion to receive the advertising message, means for defining a price of the advertising message based on the number of the at least one of mobile terminal users matching the at least one criterion, means for distributing the advertising message to the at least one of a plurality of mobile terminal users matching the at least one criterion, and means for debiting to a service user the price of the advertising message distributed to the at least one of a plurality of mobile terminal users matching the at least one criterion.

It is another object of the present invention to provide a communication system for providing an advertising message to a plurality of mobile terminals. The system comprises a dedicated server communicating with a communications network for updating a database including information selecting at least one of a plurality of mobile terminals using at least one criterion, an advertising message to be sent to the selected at least one of a plurality of mobile terminals including content to be sent to the selected at least one of a plurality of mobile terminals, the content of the advertising message being dynamically generated based on a number of mobile terminals selected using the at least one criterion to receive the advertising message before being sent to the selected mobile terminals, and a transceiver communicating with the dedicated server for transmitting the advertising message to the selected at least one of a plurality of mobile terminals.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 4 illustrates a sample screen for an entity distributing electronic coupons according to one embodiment of the invention to input the parameters for the special offer;

FIG. 7 depicts a sample table for a central register that a central entity, like an advertisement broker, may use to administer customized advertisement programs for multiple companies according to one embodiment of the present invention;

FIG. 12A depicts an example of a criteria register according to an embodiment of the present invention wherein an advertisement broker maintains records, by criteria, of how much to charge an advertiser for sending an advertisement to mobile terminal users (customers); and FIG. 12B depicts an example of an advertiser pricing database according to an embodiment of the present invention wherein the advertisement broker maintains records, by advertiser, of the number of mobile terminal users (customers) that match the advertiser's specified criteria, and the price to be debited to the advertiser for sending the advertisements.

DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Figure 1:
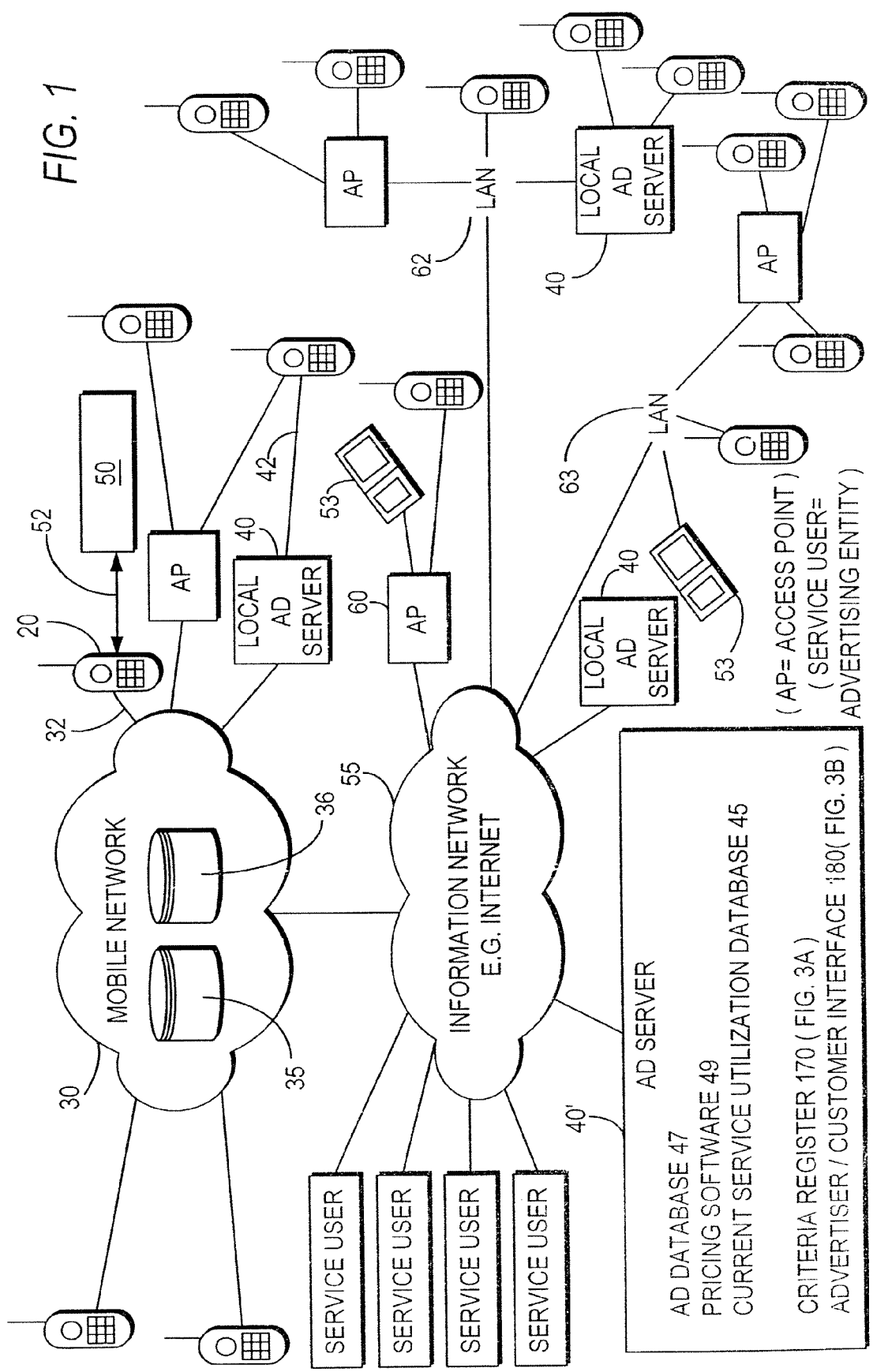
FIG. 1 depicts a block diagram of a system architecture of an exemplary embodiment of the invention.

Referring to FIG. 1, a system according to an exemplary embodiment of the invention provides one or more mobile terminal users with a wireless terminal 20, such as a mobile phone, a personal digital assistant (PDA), an e-book 53, or another terminal that wirelessly links to a wireless communications network, for example, a mobile or wireless network 30 and permits communication between terminals. The mobile terminal 20 is capable of presenting data information in any of various ways such as text, voice, audio, and multimedia to name a few examples, and may be connected or be under coverage of a mobile network 30 as shown in FIG. 1. Nokia cellular phones like Nokia 9110 can present text, voice, audio, and multimedia. The mobile network 30 may be any type of wireless communication network or combination of networks, including, but not limited to, GSM (Global Standard for Mobile/Groupe Speciale Mobile), GPRS (General Packet Radio System), UMTS (Universal Mobile Telephone System) or 3G (Third generation of mobile communications), where 3G can be compatible with GSM, HSCSD (High Speed Circuit Switched Data), GPRS, EDGE (Enhanced Data Rates for Global/GSM Evolution) and WCDMA (Wideband Code Division Multiple Access). Various other network systems can also be supported in 3G, such as CDMA (Code Division Multiple Access), PDC (Personal Digital Communications), or CDMA2000. WLAN (Wireless Local Area Network) and LPRF (Low Power Radio Frequency) techniques can also be used. The transmission may also be broadcast via DAB (Digital Audio Broadcasting) or DVB (Digital Video Broadcasting). Terminal 20 may be linked to mobile network 30 by a communication link 32, such as a link that offers linking substantially in real time. In the present invention, the link may be a one-way link or a bidirectional link.

Information regarding mobile terminal users registered with the system is stored in databases 35, 36 at the mobile network 30 or is alternatively stored elsewhere where it is accessible to the mobile network 30. A mobile user's location database 35 stores information regarding the location of mobile terminal users and thereby enables the provision of an advertising message (electronic coupon message) only to users at or near a particular location. There are a number of currently known ways to ascertain the location of mobile terminal for inclusion in database 35, such as including in mobile terminal 20 or in a device connected thereto a global positioning system (GPS) capability, a cell identification system which can identify the cell of mobile network 30 in which mobile terminal 20 is located at a particular moment of interest, and/or a system that can identify terminal coordinates of a mobile terminal using location information of a short range network node, which coordinates are geographically defined, communicating with the mobile terminal 20. Another way of limiting the distribution of electronic coupons by location is to transmit electronic coupons in a limited transmission area such as with a short range communication link like Bluetooth within or near a store so that only people within the range of the communication link receive the offer.

Users can be required to register with the system in order to be granted permission to use it. Regardless of whether registration is required, any user profile information the users provide, including user preferences, such as at the time of registration, is stored in mobile user profiles database 36. The mobile user profiles database 36 enables the system to limit the sending of advertising messages to registered mobile terminal users who are in the vicinity of an advertising entity and who indicate certain user preferences. The user profiles in database 36 may be compiled in any way such as by a central entity like an advertisement broker who collects various types of user information in any number of ways, or by the advertiser who collects the information itself, such as through a company web site maintained on the Internet where customer preferences are solicited. Mobile user profiles database 36 may thus contain user-defined information, such as information identifying the mobile terminal users, their demographics, each user's annual income and buying power, preferred types of goods and services and special offers, etc., and may also contain information collected about the users based on previous usage of the inventive system or other means of gathering user profiling information. Alternatively, data relating to a particular user's preferences may be stored in memory of the particular user's mobile terminal 20. The user profile data may be organized in several levels, generally corresponding to different levels of security clearance, such that specific advertisers have access to one or more levels of the user profile while completely confidential user information, such as the user's social security number, if provided, may only be available to the manager of database 36.

Mobile network 30 is linked to and communicates with a local advertisement server 40 that can dynamically generate advertising messages, such as electronic coupons, to be transmitted to customers 10 in a targeted fashion. Advertising messages generated by server 40 are transmitted as packets of data in a format that mobile terminals 20 can receive and access, such as a short message service (SMS) message format or another message format which may be sent using the wireless application protocol (WAP) where mobile terminal 20 is a WAP-enabled mobile terminal. Server 40 contains a current service utilization database 45 (as shown for a centralized advertisement server 40' discussed further below) that serves as a central register that may be used to maintain records of the current advertisers and advertising messages that are being, or are scheduled to be, distributed. Moreover, server 40 usually contains in advertisement database 47 any predetermined portions of the content of the advertising messages to be distributed. The host of server 40 may be for example a centralized entity, like the service provider of mobile network 20, an application service provider (ASP), an advertisement broker (which has several accounts), or the company that is placing the advertising through the company's private network. Instead of having local advertisement server 40 and mobile terminal 40 communicate via mobile network 30, local advertisement server 40 may communicate directly with mobile terminal 20 over a communication link 42, for example.

Mobile terminal 20 may also be linked via a short range communication link 52, such as a Bluetooth link, to a coupon redemption terminal 50 to which mobile terminal 20 can wirelessly send information about the terms of a special offer in the electronic coupons so the coupons can be redeemed. Coupon redemption terminal 50 may comprise an appropriately equipped cash register, as shown in FIG. 1, which is able to process transactions electronically so that an electronic coupon can be redeemed and a transaction paid for and completed at a single coupon redemption terminal. Coupon redemption terminal 50 may receive the Bluetooth data packets either at a Bluetooth transceiver in coupon redemption terminal 50 or through a Bluetooth access device (not shown) connected to coupon redemption terminal 50.

Rather than connecting an advertisement server 40 directly to mobile network 30, mobile network 30 may be linked to the Internet 55 and an advertisement server 40 may be linked to the Internet 55. This advertisement server 40 may be a centralized advertisement server 40' for centralized management of advertisement creation and distribution by an advertisement broker. Using the network of FIG. 1, it is possible for a broker to offer advertisers (service users) dynamically generated electronic coupons to be distributed to mobile terminal users, who match the criteria set by advertisers. There could actually be several competing brokers, each linked to the network through its own advertisement server and offering the electronic coupon distribution services to advertisers. The centralized advertisement server 40' may supplement other local advertisement servers 40. Location and profiles databases 35, 36 may be located on server 40' or located elsewhere on the network, such as at one of the local advertisement servers 40.

The connection to the Internet 55 also provides other ways, such as those illustrated in FIG. 1, for mobile terminals 20 to link to advertisement servers 40 in order to receive electronic coupons. For example, FIG. 1 illustrates an access point 60 (AP) linking to mobile terminals 20 such as a mobile phone and an e-book (electronic book) reader 53, and connections to local area networks (LANs) 62, 63 that in turn link to another local advertisement server 40, and an access point 60, respectively.

Figure 2:
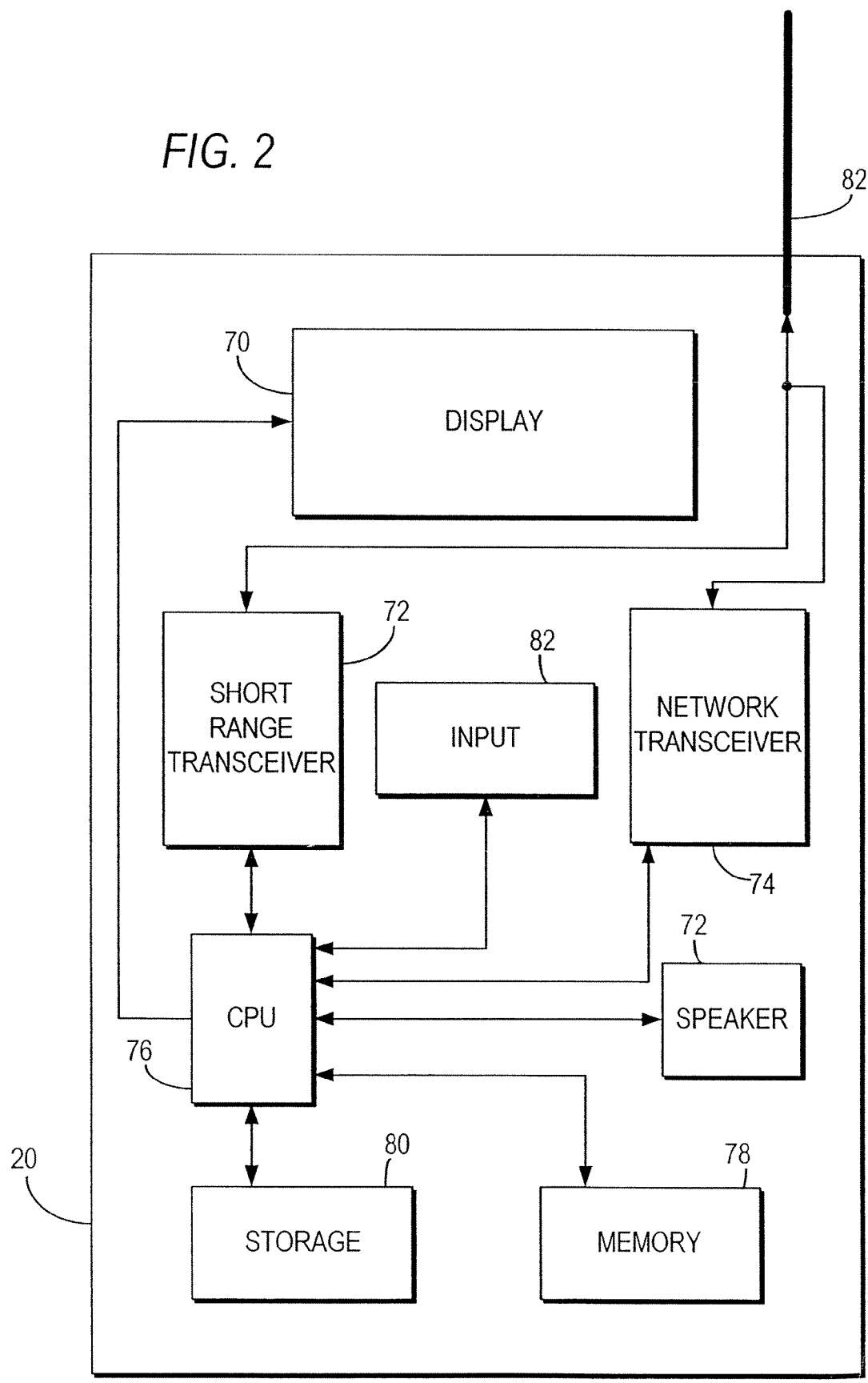
FIG. 2 depicts a block diagram of a wireless terminal showing components according to an exemplary embodiment of the invention.

FIG. 2 shows a simplified picture of mobile terminal 20 according to an exemplary embodiment of the invention illustrating necessary components to perform the procedures relating to this invention. The mobile terminal 20 has a display 70 that allows the user 10 to visually read information and may allow the user to view multimedia information such as video. The mobile terminal 20 may also provide voice or sound output through an optional speaker 71. Mobile terminal 20 may further comprise a short range transceiver 72 to communicate with cash register 50, a network transceiver 74 to receive transmissions from and to transmit requests to mobile network 30, a central processing unit (CPU) 76 for controlling and executing all necessary procedures, a memory 78, a data storage unit 80, an antenna 82, and one or more inputs 82 for inputting information into mobile terminal 20. The data storage unit 80 can be, for example, a hard disk magnetic or optical storage unit, as well as a CD-ROM drive or a flash memory. Input 82 may be, for example, a numeric keypad, a keyboard, a software keyboard touch screen, a touch screen (in combination with the display 70), a mouse, a pointing device such as pointing pen, etc. In the case of DVB or DAB, the terminal must also have a DVB or DAB receiver (not shown). If necessary, an application at mobile terminal 20 transforms the packets received by mobile terminal 20 in a first format to convert the advertising message packets into packets having a different format that may be used for transmission of the electronic coupon data to coupon redemption terminal 50.

Figure 3A:
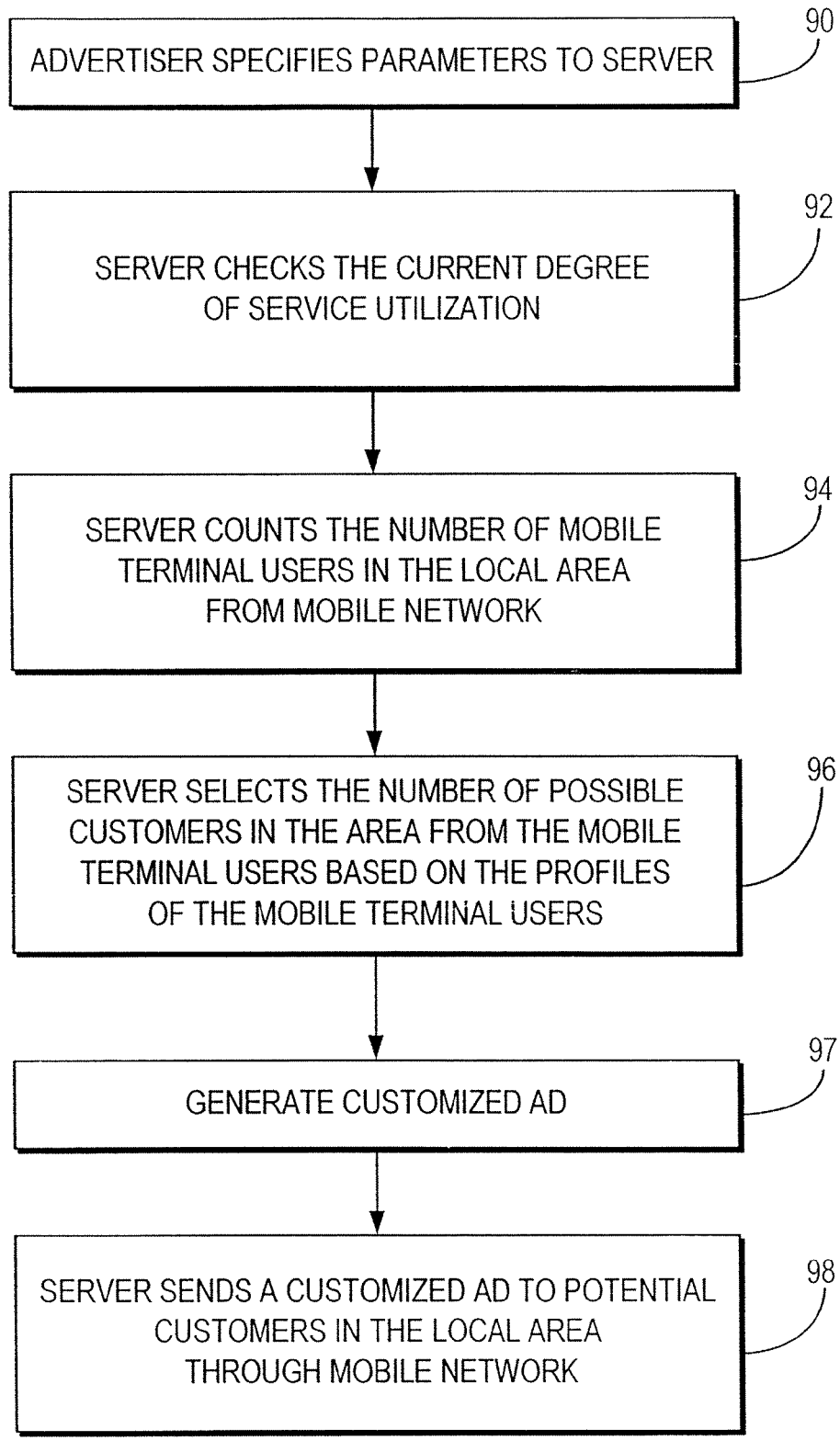
FIG. 3A illustrates a flow chart of the steps for performing the method of allocating and sending a customized electronic coupon to potential customers according to an exemplary embodiment of the invention.

The flow chart of FIG. 3A indicates the steps required for generating and sending a customized advertising message to users 10 according to a first embodiment of the invention. The method starts with an advertiser initiating a promotional campaign with the host of advertisement server 40. The advertiser specifies the parameters for the customized promotional campaign (step 90). For example, the advertiser may specify a budget (e.g., $1,000) for a one-time promotion of a product. The advertiser may also specify a minimum, maximum or average number of users it wishes the advertising message to reach (which is also generally dependent on the budget), the location(s) of registered mobile terminal users in which vicinity the advertising message should be distributed (e.g., within a particular mall or store, within a particular neighborhood, city, etc.), and the time of distribution (e.g., distribute to early bird shoppers before 11 a.m. only). Step 90 need not be performed first and may be performed at any time before step 97.

At step 92, an advertisement server 40, or centralized advertisement server 40', checks the current degree of service utilization as recorded in current service utilization database 45 so that it knows which mobile terminals 20, for whom user profile information is available, are ready to receive an incoming transmission and the profiled capabilities of those terminals. Server 40 then counts (meters) the number of mobile terminal users eligible to receive the advertising message that are currently within a specified local area where an advertiser wishes to distribute a particular advertising message (step 94) using the user location information stored in the mobile users' location database 35 at mobile network 30. In determining the number of mobile terminal users in a specified area, only mobile terminals that are turned on and are able to receive communications are counted.

Next, server 40 determines the potential customers who should receive a particular advertising message based on the profiles of the mobile terminal users that are maintained in mobile user profiles database 36 (step 96). For example, some users may not want to receive advertising messages about jewelry but do want to receive advertising messages about electronic equipment. If a particular user does not wish to receive certain categories of advertising messages, advertising messages will not be sent to them. In compiling user profile information, each user may also specify information about when he is unavailable or does or does not wish to receive advertising messages (e.g., a user may specify that he does not wish to receive advertising messages at his mobile terminal while at work during specified hours and/or may specify other user-specified criteria about the context in which the user wants to receive advertising messages.)

The advertiser itself can limit the number of targeted users based on various criteria, such as user preferences specified by the advertiser—including demographics, areas of interest, age, user income, etc.—and/or specified context-of-use data, which includes data like current location of users, current user's predetermined business schedule (so that offers are only extended during non-working hours of the user), and users who previously redeemed coupons such as electronic coupons that were previously sent in advertising messages. Other possible criteria that may be used to limit the number of targeted users comprise profiles of the terminals available to receive advertising messages, the approximate time of day an advertising message is to be sent, the business density at a particular time (i.e. how busy an advertiser is at a particular time), and advertising campaign limitations such as budget limitations. Moreover, the potential customers who receive the advertising messages may be randomly selected or limited to previous customers, or the advertising messages may be distributed for utilization by a specifically limited number of customers who avail themselves of the offer on a first-come, first-served basis. Or, where the advertising messages are to be distributed in a specified local area, server 40 may be instructed to limit the number of potential customers who will receive the advertising messages to fewer than the overall number of current, registered users in the specified local area. The advertiser can actually specify a maximum limit on the number of persons to whom advertising messages are sent to keep within a particular budget for an advertising campaign or, as will be explained further below, to insure that any electronic coupon in the advertising message have a minimum or maximum value.

After determining who will receive a particular advertising message by location, profile, etc., the system dynamically generates the advertising message in accordance with advertiser-specified criteria. (step 97). The value of any discount or promotion offered by the generated electronic coupons in the advertising message is assigned to the electronic coupons at the time that the advertising message is dynamically generated. (The value of the electronic coupon can be provided in the form of any type of special offer such as, for example, as a monetary amount to be deducted from a regular sale price, a reduced price offer on an item, a free item, an amount of points to be rewarded for making a purchase which points can be redeemed for another item, etc.) The value may be dependent on one or more criteria, such as the promotion's budget, the number of persons to whom the advertising message is to be sent and/or the level of business at the advertiser. According to this latter criteria, the advertiser can, for example, modify the discount according to the prevailing situation in the business. If there are just a few customers present at the advertiser's business premises, for example, the advertiser could distribute a $3 coupon to the possible customers within the premises, the customer expiring within a limited time (e.g. 15 minutes). When the advertiser is busy, such as at rush hour times, the discount could be only $1. By offering bigger promotions during less busy times, the advertiser can try to balance out and stabilize the store's business utilization throughout the day.

As an example, a merchant Pizza Shop broadcasts electronic coupons to users of mobile terminals 20 who are at or near the retail establishment of the Pizza Shop at 5 p.m. At least some of these users have previously registered with Pizza Shop to receive advertisements at their mobile terminals when on the premises of Pizza Shop. Pizza Shop decides to offer a promotional discount to a target audience that includes all registered users within 500 meters of its premises (a context-of-use restriction), and all registered users of restaurant services who are members of mobile network 30 (a user preference). Pizza Shop specifies a budget for this particular promotion of $1,000. Advertising server 40 determines how many registered users there presently are in the targeted audience. A dynamic pricing application 49, typically implemented in software, at server 40 then determines the amount of an electronic coupon that is to be sent to a particular user. For example, if there are 1000 current users, the 1000 users will each be sent an electronic coupon for $1 off any pizza order from Pizza Shop until 8 p.m. If there are only 100 current users, then the 100 users will each be sent an electronic coupon for $10 off any pizza order from Pizza Shop until 8 p.m. Instead of specifying a budget before determining the amount of each electronic coupon, an advertiser may first inquire of the mobile network 30 how many current users meet the specified criteria of the campaign and the advertiser can then decide on the scope and amount of the promotion. In this example, allowing the advertiser to place a total limit on the total number of users who receive these electronic coupons can prevent the generation of coupons that have too insignificant a value, as would happen if for example 50,000 users were eligible to receive the coupons and the $1,000 budget had to be divided among all those users.

It should be understood that, because the promotion may be customized, not all of the coupons distributed to multiple users for a particular promotion need to be of equal value. For example, previous coupon users may get a larger discount allotted to them on currently distributed electronic coupons or, as another example, the value of an electronic coupon to a particular user may be randomly chosen by server 40.

Figure 3B:
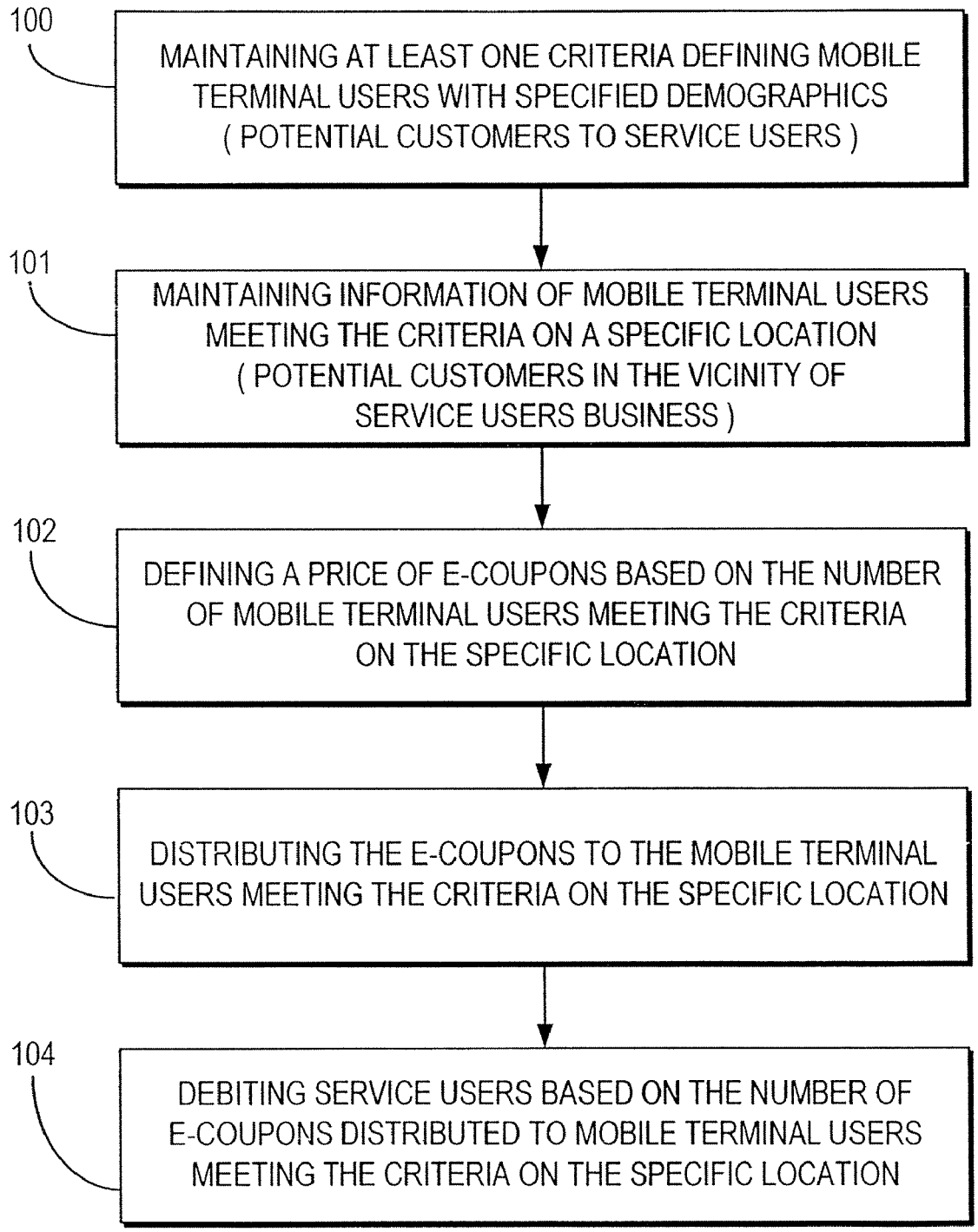
FIG. 3B illustrates a flow chart of the steps for the dynamic pricing and distribution of the electronic coupons according to another exemplary embodiment of the invention performed by an advertisement broker.

FIG. 3B shows an algorithm according to another exemplary embodiment that an advertisement broker can use to dynamically generate and distribute electronic coupons on behalf of advertisers for distribution to mobile terminal users who match (i.e. meet) criteria set by the advertisers. At step 100, in addition to location database 35 and profile database 36, a criteria database 170, as shown in FIG. 12A, is created and maintained somewhere on the network, such as at advertisement server 40'. The criteria database 170 defines one or more group of criteria (e.g. demographics) and pricing, per criteria, for sending electronic coupons, the pricing in the illustrated database 170 being based on the number of mobile terminal users (customers) to whom the electronic coupon is to be sent in accordance with criteria for selecting mobile terminal users specified by the service user (i.e. advertiser). At step 101, mobile terminal users who meet the specified criteria, according to profiles database 36, and are in a specific location designated by the advertiser, according to location database 35, are selected to receive electronic coupons. These are generally potential customers who are in the vicinity of the advertiser's business location. At step 102, a price that the advertisement broker will charge the advertiser for electronic coupons that will be generated and distributed is defined based on the number of mobile terminal users (customers) who have been selected in step 101 to receive the electronic coupons. The pricing is determined based upon criteria defined by the advertisement broker and recorded in a criteria database 170, an example of which is shown in FIG. 12A. In the illustrated example, where customers meet a first set of criteria, criteria database 170 provides for charging an advertiser $0.03 per electronic coupon sent by the advertisement broker if 0-100 customers are to be sent the electronic coupon, criteria database 170 provides for charging the advertiser $0.04 per electronic coupon sent by the advertisement broker if 101-500 customers are to be sent the electronic coupon, and criteria database 170 provides for charging the advertiser $0.05 per electronic coupon sent by the advertisement broker if 500 or more customers are to be sent the electronic coupon. Where a particular electronic coupon is to be sent to customers who meet a different set of criteria, a different pricing schedule may apply. The total price that the advertiser is to be charged for a total number of electronic coupons of a particular type is recorded in a database 180, as shown in FIG. 12B, along with other information, including advertiser identification, advertisement identification (Ad ID), and the number of customers meeting the criteria for the particular advertisement. The pricing charged to advertisers will typically be based on the volume of electronic coupons to be distributed. At step 103, the electronic coupons are dynamically generated and distributed to the mobile terminal users meeting the criteria and who are in the vicinity of the specified location. At step 104, the service users are debited (charged) based on the number of electronic coupons distributed to mobile terminal users meeting the criteria and who are in the vicinity of the specified location.

FIG. 4 shows an example of a data entry screen 105 according to an exemplary embodiment of the invention at which an advertiser or advertisement broker may enter the parameters into server 40 for the generation of advertising messages comprising electronic coupons according to the invention (step 90). In this example, the parameters are specified after step 94 at which server 40 is already informed of the number of mobile users who are possible customers. Thus, a first field 106 informs the advertiser that there are, for example, 50 potential customers in a given area or for an advertiser-specified profile. The advertiser chooses whether to send electronic coupons by selecting "yes" (or "no") in field 107, the particulars of the advertised special ($5 Big Lunch) at field 108 and whether to set a time limit (such as "before 11 a.m.") at field 109. The result of this selection is that cash register 50 will only accept the electronic coupon if the coupon for the $5 Big Lunch is used before 11 a.m.

Figure 5:
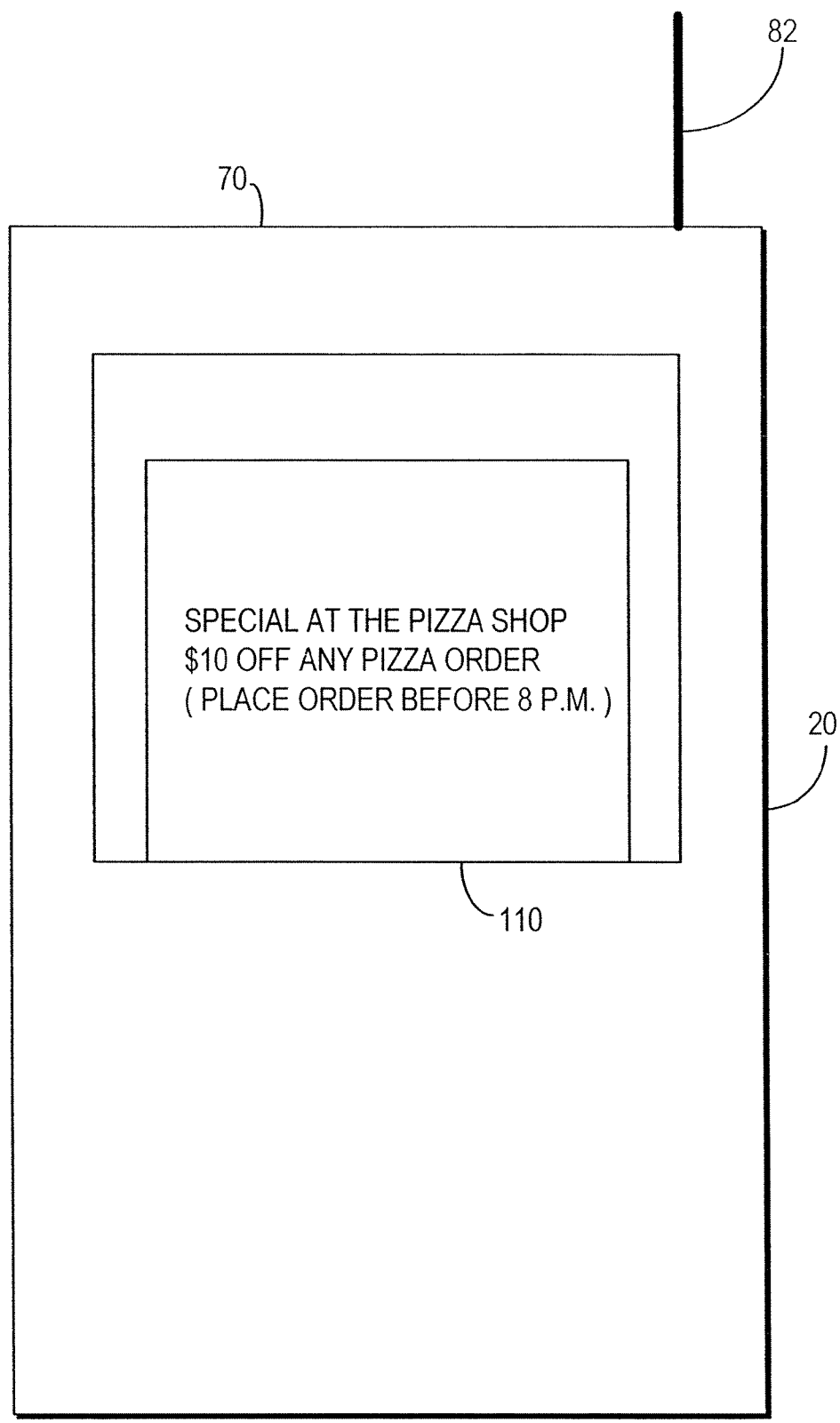
FIG. 5 depicts a display of a mobile terminal displaying a sample wirelessly received electronic coupon according to an exemplary embodiment of the invention.

Finally, server 40 broadcasts the generated advertising messages to the mobile terminals 20 of potential customers 10 in the targeted local area through mobile network 30 (step 98). A sample of an electronic coupon 110 as shown on a display 70 of mobile phone 20 according to an exemplary embodiment of the invention is shown in FIG. 5.

Figure 6:
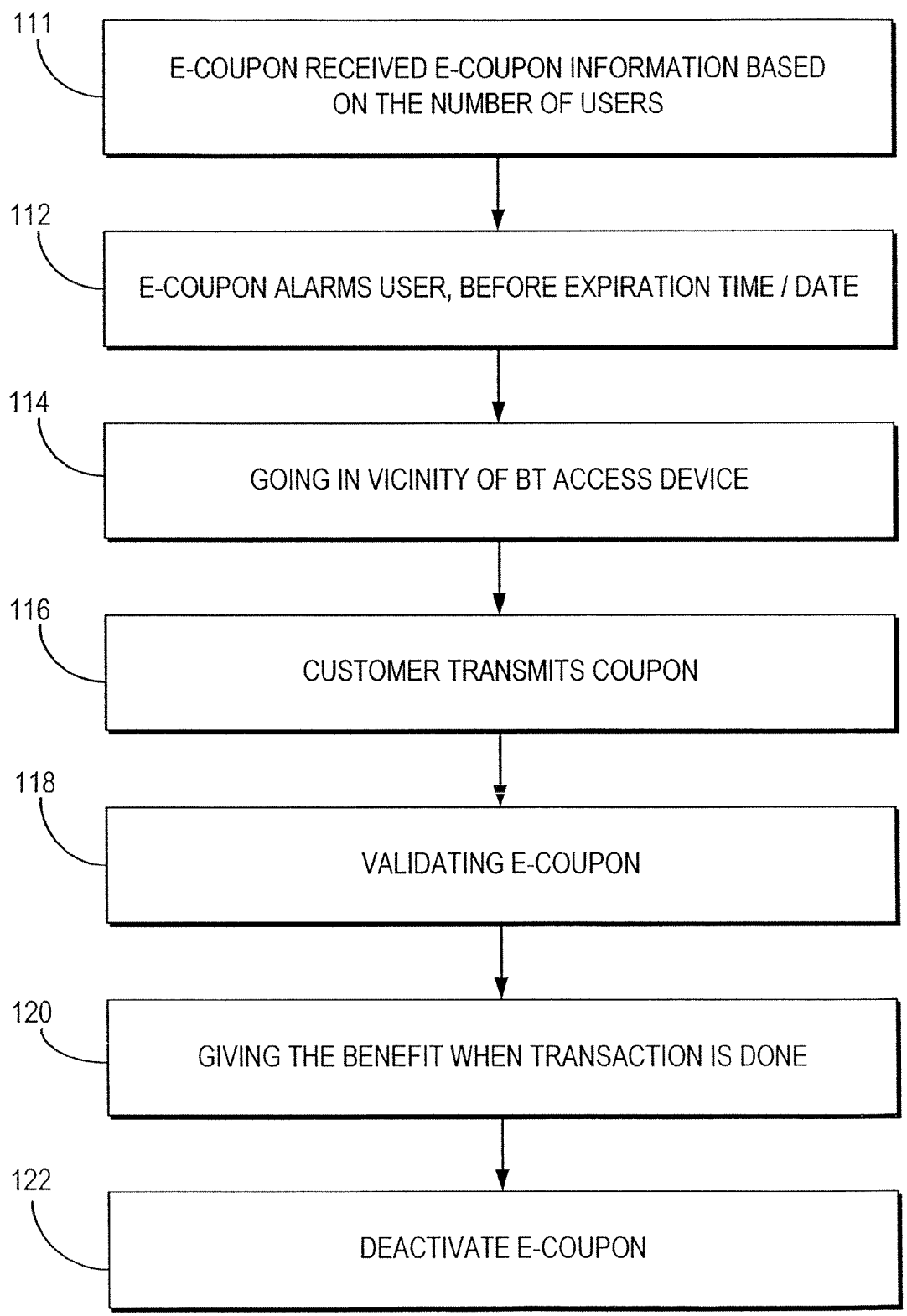
FIG. 6 illustrates a flow chart of the steps for performing the method of receiving and utilizing a coupon or other special offer according to an exemplary embodiment of the invention.

FIG. 6 illustrates in a flow chart the steps according to one exemplary method embodying receiving and utilizing of an electronic coupon. The electronic coupon is received by users 10 at their mobile terminals 20 (step 111). Each user 10 receiving an electronic coupon is alerted to the arrival of an advertising message upon arrival at their mobile terminal (step 112). The user then determines whether to use the electronic coupon in the advertising message, which is usable until such point that it expires, which may occur for example at a predetermined expiration date or time. (The user may be given the option of transferring the electronic coupon to another user's mobile terminal for the other user to use. However, in this case to prevent copies of electronic coupons from being created without permission of the advertiser, which would inflate the advertising budget, the coupon may be assigned a unique serial number or code as described below.) To redeem the electronic coupon, the customer moves within the communication range of the coupon redemption terminal 50, which in our example is the cash register. A communication between mobile terminal 20 and cash register is established over a short range communication link 55 (step 114) and the customer thereupon transmits the electronic coupon to the coupon redemption terminal 50 which may be the cash register (step 116), or the coupon redemption terminal 50 may be used to retrieve the electronic coupon via the short range communication link 55. The cash register validates the electronic coupon (step 118) to verify the authenticity of the electronic coupon by matching the electronic coupon to current service utilization database 45 or at a similar database (not shown) that is local to the cash register where information about current electronic coupon offers is stored.

To eliminate counterfeiting, each electronic coupon may be assigned a unique serial number or code identifying it and the validation process will then match the electronic coupon to a database of valid electronic coupon serial numbers. The usage of the electronic coupons can thereby be tracked. The electronic coupon may include also include, for example, source, encryption or destination information.

Upon validation, the customer is given the benefit of the electronic coupon and remits any remaining balance due (step 120). Once the electronic coupon is used, its associated serial number may be deactivated from the database of valid electronic coupon serial numbers (step 122). Steps 116-120 enable the "realization of" (i.e., the user's buying of products or services with) the coupons. Because the electronic coupon is transmitted directly from mobile terminal 20 to the cash register, there is no need to print the electronic coupons. Electronic coupons may be stored in an electronic coupon database in memory 78 at mobile terminal 20 if a user does not use the electronic coupon on a particular visit to a store and the offer does not expire until the user's next visit. The information regarding the realization of the coupons is compiled in real-time and the information may be used in determining to whom another round of electronic coupons should be sent. The value of unredeemed electronic coupons may be retained by the advertiser or may later be distributed as additional electronic coupons to others in a later broadcast. Alternatively, a coupon may be printed out at a printer that becomes linked to mobile terminal 20 and redeemed.

It may be advantageous, particularly where an electronic coupon is of substantial value, to provide the electronic coupon in a more secure way to a particular mobile user. In one such technique, in addition to attaching a simple serial number to the electronic coupon for validation at step 118 advertisement server 40 may attach a digital signature to the electronic coupon based on conventional public-key cryptography. This signature is generated in two steps: (1) a electronic coupon digest, which is a short fixed-length hash code, is generated by a one-way hash function; and (2) the electronic coupon digest is encrypted using a secret private encryption key. The cash register 50 uses a public decryption key to verify that the electronic coupon has indeed been generated and signed by advertisement server 40. This is done by checking whether the decrypted signature equals the "original", unencrypted electronic coupon digest generated by the one-way hash function. Cash register 50 can then send the electronic coupon serial number to the advertisement server 40 (possibly together with other information) for validation. The advertisement server 40 checks that an electronic coupon with that serial number has not been used already, and then marks that particular electronic coupon serial number as one that has been used.

Advertising messages for multiple advertisers may be distributed using this method. FIG. 7 depicts a table 130 which is a central register that may be maintained on server 40 and used by an advertisement broker to administer customized electronic coupon programs for multiple companies who distribute electronic coupons using the inventive system and which coupon redemption terminal 50 can use to validate the proffered electronic coupons according to one embodiment of the present invention. Table 130 may have several columns including column 132 in which the advertiser is listed, column 134 which lists the location in which the coupon is to be distributed if the distribution is to be so limited, and column 136 which lists the particular coupon to be sent. Column 138 lists the total number of coupons distributed and may also list the number of actual customers who have redeemed the distributed electronic coupons.

Another method of distributing electronic coupons to mobile terminals 20 is for an advertiser to generate the coupons locally at the coupon redemption terminal 50 or at another computer terminal, such as a server (not shown) connected to coupon redemption terminal 50. Persons in the vicinity of the advertiser's premises can receive the advertising message using a short range communication link from a short range communication transceiver, such as the Bluetooth transceiver at cash register 50, that transmits the advertising messages directly to mobile terminals 20 within transmission range. Thus, in this case, no outside broker is needed. The user profiling can be collected directly by the advertiser, such as at the advertiser's web site or by any other means. Registration for the system in order to receive advertising messages may be required. Again, the number of users to receive the advertising messages is metered and the value any electronic coupons to be sent varies depending on the total number of persons to receive the advertising message. In this embodiment, using the example of FIG. 4, the coupon redemption terminal 50 or other terminal might send to 50 nearby users an electronic coupon that may be redeemed for a $5 Big Lunch if used on a specified date before 11 a.m. Coupon redemption terminal 50 will only accept and redeem the electronic coupon if it is used before 11 a.m. It is also possible to link coupon redemption terminal 50 to advertisement server 40 over the network or by some other means so that a centralized server can be used to manage the electronic coupons but delivery of the electronic coupons and other functions are arranged in a geographically defined area by specifying the geographic location using the defined location information of a specified Bluetooth access point, as for example, in entry 6 of table 130 (FIG. 7) over which the offer is to be transmitted.

As is evident from this example, the system permits a customized promotion to be offered wherein the promotion budget or value can be determined very shortly before the promotion is generated and offered based on knowledge of current demand, supply, and desired profitability of the campaign. The promotional offer can also be dynamically priced and customized to the targeted audience (e.g., teenager can get $2 off a pizza, while an adult only gets $1 off a pizza). It should be further recognized that multiple electronic coupons could be sent to a single user by advertisement server 40 at any one time, whether from a single advertiser or multiple advertisers.

Figure 8:
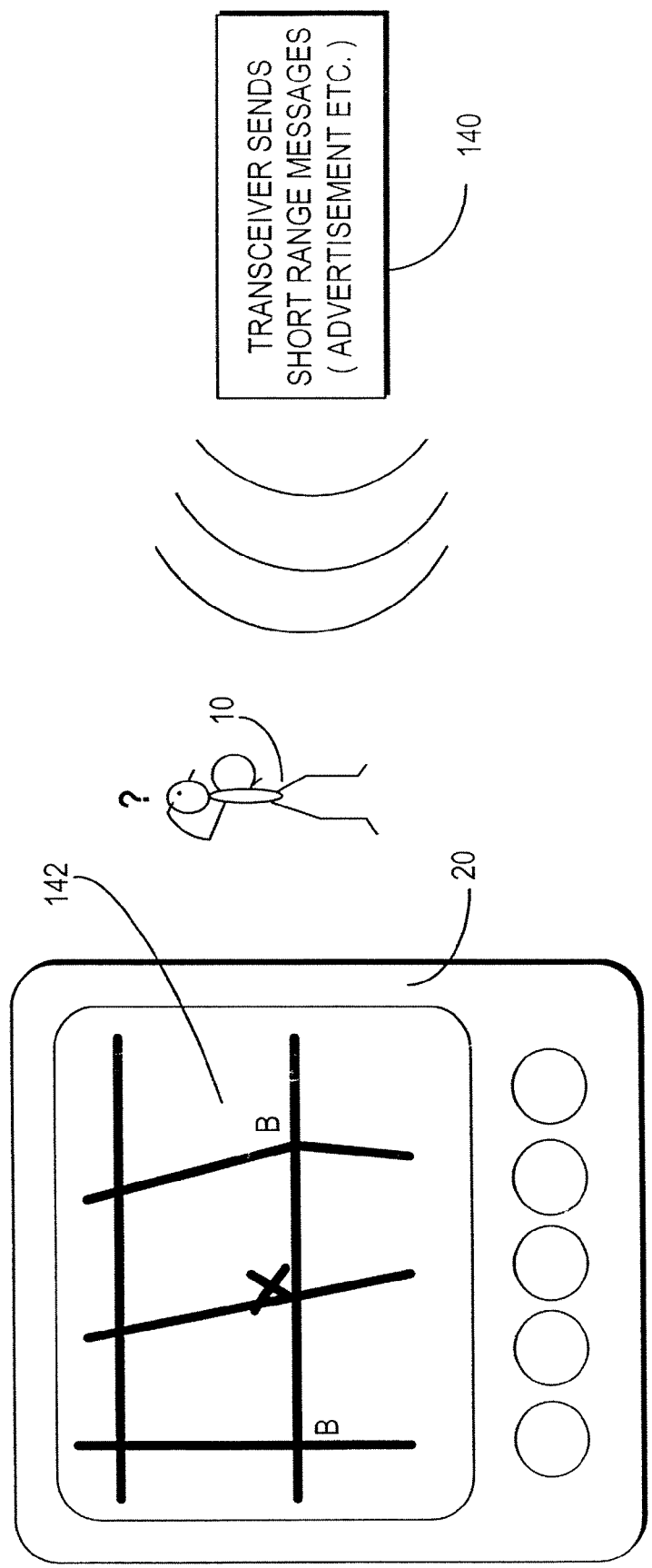
FIG. 8 depicts the transmitting of information, including location information, using a short-range communication to be received by a mobile terminal according to another embodiment of the present invention.

As an additional incentive for a user to agree to accept advertising messages regardless of whether or not the advertising messages include electronic coupons, the user may be provided with location information along with the advertising. Using localized short range transceivers 140 placed in stores to transmit advertising messages whether or not the advertising messages include electronic coupons to the mobile terminals, the transceivers 140 may also be used to transmit location information to the users at their respective mobile terminals using mobile terminal transceiver 72. This location information may be straightforward location information, which must be in a format recognizable by mobile terminal 20, such as a text message indicating that "You are at Avenue A and 2.sup.nd Street." or the location information may be longitudinal and latitudinal location coordinates in a format compatible with a GPS system to be displayed on mobile terminal 20 generally in a map style 142 as shown in FIG. 8 according to another embodiment of the present invention.

For example, a fast food store (e.g. B-Burger) may send a short range wireless transmission from transceiver 140 in the store. The transmission may contain information such as a current menu and a list of currently available documents. Upon receipt at mobile terminal 20, this data may be accepted or rejected by the user. To entice a user to accept the transmitted advertising message, location information may be added to the other coupon information. As the user comes near the store, he receives the advertising message and, if the user accepts the advertising message, he can also receive the location information for free. Mobile terminal users can also agree in advance of receiving the advertising message to accept all advertising messages, or all advertising messages of a type (e.g. by type of store, type of offer, etc.).

Figure 9:
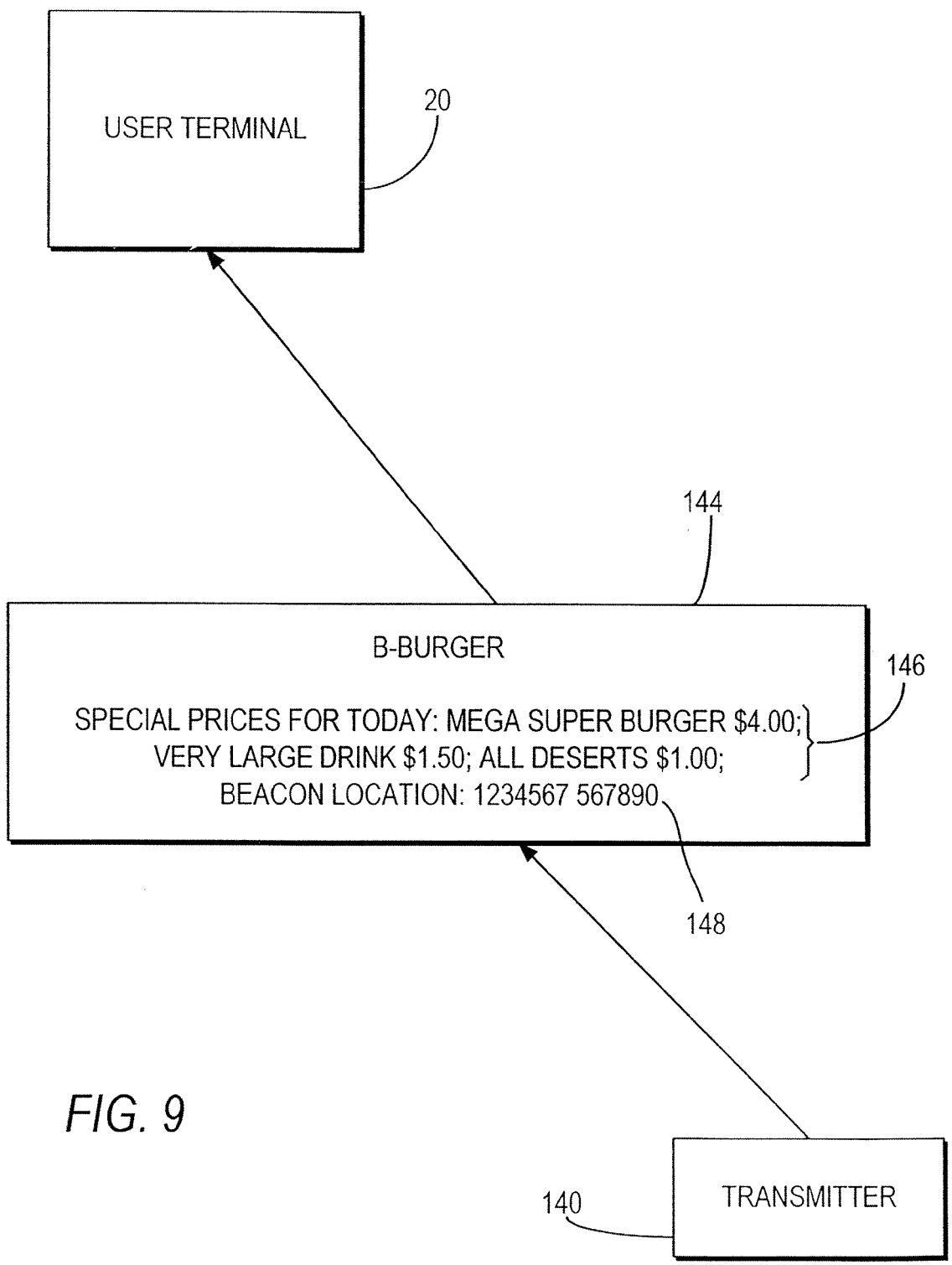
FIG. 9 depicts the transmission of an electronic coupon containing location information according to the embodiment of FIG. 8.
Figure 10:
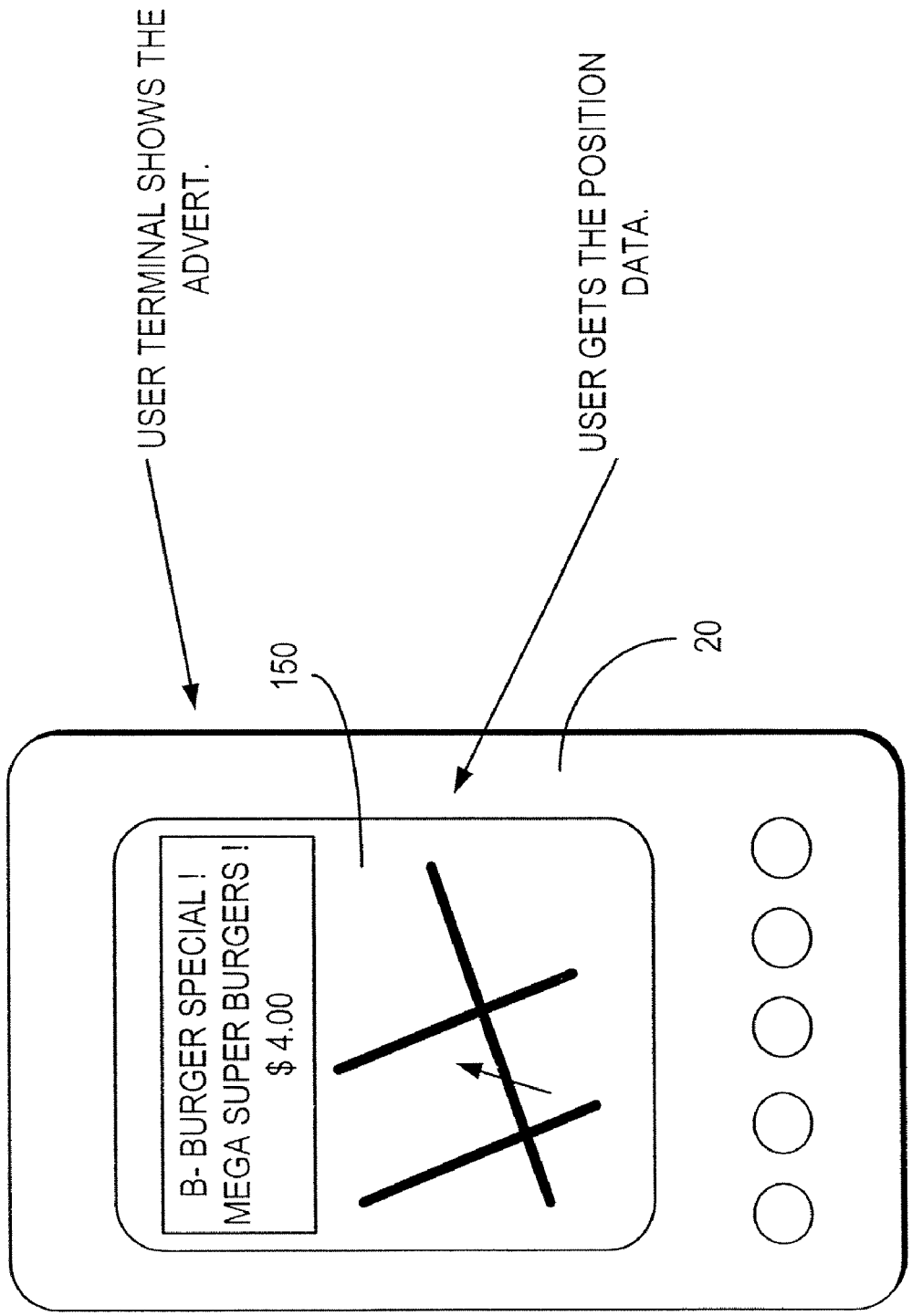
FIG. 10 depicts the display of the electronic coupon and location information on a mobile terminal according to the embodiment of FIG. 8.

The described example is further illustrated in FIG. 9 embodying the another embodiment of the present invention wherein a transmitter 140 transmits data 144 comprising an advertising message to terminal 20. The "special price" information 146 in data 144 is listed first (e.g. "Mega Super Burger $4.00) and the location information 148 is transmitted as a "Beacon location" which, if this location information is not in a user-understandable format, terminal 20 can translate to user-understandable information using a beacon location table in terminal 20. The advertising message and location information may be displayed on terminal 20 as shown in FIG. 10. An advertising message 146 is shown in this figure displayed at the top of a display on terminal 20 and the location information 148 is translated into map 150.

Providing location information via transceivers/transmitters 140 is very useful in dense city centers where GPS might not be received correctly, such as due to blockage of the GPS signal by tall buildings, but short range advertising message and data transceivers or transmitters are present. This method of transmitting location information can also be used to transmit the information inside buildings, such as shopping centers and can be used to create a locator network totally independent of the GPS system. Transmitters at local restaurants and shops can provide short range transmissions and prevent the user from getting lost. This invention also increases the possibility that the mobile terminal users read the received advertising messages which are provided by big businesses who also provide beneficial location information. It is advantageous to limit the range of transceivers 140 and hence the coverage area so that users only receive the location information when close enough to the transceiver 140 where the location information is sufficiently accurate and meaningful.

Figure 11:
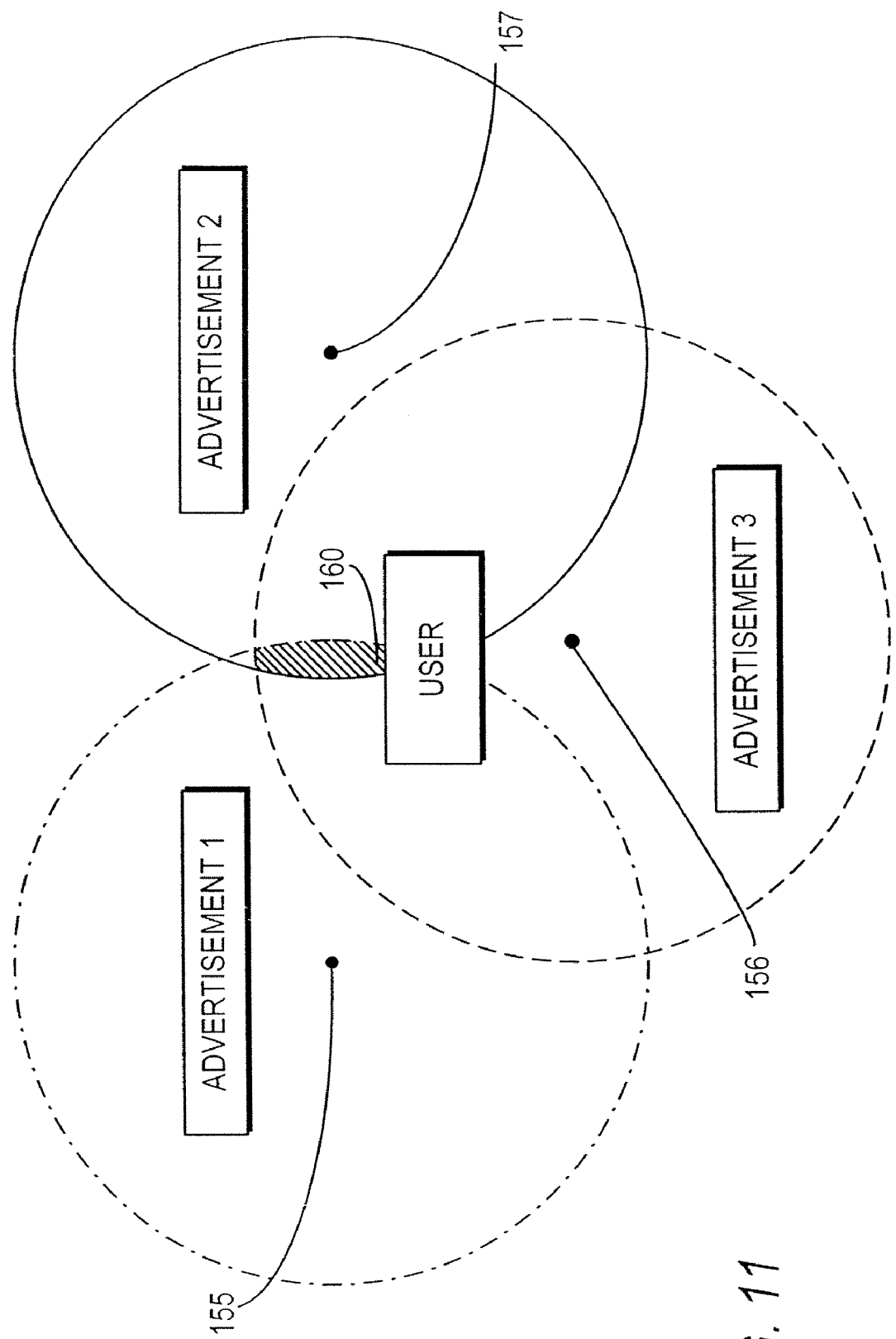
FIG. 11 depicts the transmission of multiple advertisements comprising location information for three separate short range transmitters according to yet another embodiment of the present invention.

Rather than accept approximate location information, the user's location may be determined with greater accuracy from multiple incoming transmissions that may be received from various transceivers 140. The provided location information of the transceivers 140, such as the three transceivers 155, 156, 157 in FIG. 11 according to yet another embodiment of the present invention, and the known magnitude of each signal are used to calculate the position of the user using the well-known method of triangulation or other positioning methods, such as those described in U.S. Pat. Nos. 6,108,553, 6,011,487, 5,952,958, 5,815,114, 5,629,678 and 5,051,741, which are incorporated herein by reference, to achieve relatively good accuracy. The more transmissions that are received, the greater the accuracy with which the location can be determined at the intersection area 160 of the coordinates provided by each of the transmissions broadcasting location information. Where a network of short range transceivers 140 are installed throughout an area, a GPS system may be unnecessary for that area as location information may be distributed throughout the coverage area of the various short range transceivers 140.

The system and method described herein are particularly useful in a situation where an advertiser wishes to place an on-the-spot advertising promotion because the advertising messages can be generated and transmitted to the mobile terminals substantially in real-time. The invention also makes it easier for an advertiser to target the advertising to a desired target group, which is currently in the vicinity of a business' premises. Also, the business has the ability to alter the advertising message almost "online" based on the degree of utilization of any electronic coupons and the number of potential customers determined to be in the proximate area of the business.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

We claim:

1. A method, comprising:
receiving information associated with at least one advertising campaign including at least one specific criterion;
receiving information associated with a plurality of mobile terminals;
selecting by an apparatus at least two of the plurality of mobile terminals using the at least one specific criterion;
creating by the apparatus an advertising message to be sent to the selected at least two mobile terminals, the advertising message including a monetary value dynamically generated based on the at least two of the plurality of mobile terminals selected using the at least one specific criterion to receive the advertising message; and
transmitting the advertising message with the monetary value to the selected at least two mobile terminals.

2. The method of claim 1, wherein the at least one specific criterion comprises the number of mobile terminals in a specific location.

3. The method of claim 1, wherein the at least one specific criterion comprises profiles of the selected at least two mobile terminals.

4. The method of claim 1, wherein the at least one specific criterion comprises the number of mobile terminals in a specific location and profiles of the selected at least two mobile terminals.

5. The method of claim 1, wherein the step of receiving information associated with a plurality of mobile terminals comprises receiving user profile information and mobile terminal location information.

6. The method of claim 1, wherein the step of creating the advertising having identical content and including the monetary value is sent to the selected at least two mobile terminals with identical content.

7. The method of claim 1, wherein dynamically assigning a monetary value comprises using a second criterion to determine the monetary value.

8. The method of claim 1, wherein the monetary value is associated with in a form of an electronic coupon.

9. An apparatus comprising:
   at least one processor; and
   at least one memory including computer program code,
   the at least one memory and the computer program code configured to, with the at least one processor, cause the apparatus to perform at least the following,
   receive information associated with at least one advertising campaign including at least one specific criterion;
   receive information associated with a plurality of mobile terminals;
   select at least two of the plurality of mobile terminals using the at least one specific criterion;
   dynamically create an advertising message to be sent to the selected at least two mobile terminals, the advertising message including a monetary value dynamically generated based on the at least two of the plurality of mobile terminals selected using the at least one specific criterion to receive the advertising message; and
   transmit the advertising message with the monetary value to the selected at least two mobile terminals.

10. The apparatus of claim 9, wherein the at least one specific criterion comprises the number of mobile terminals in a specific location.

11. The apparatus of claim 9, wherein the at least one specific criterion comprises profiles of the selected at least two mobile terminals.

12. The apparatus of claim 9, wherein the at least one specific criterion comprises the number of mobile terminals in a specific location and profiles of the selected at least two mobile terminals.

13. The apparatus of claim 9, wherein the information associated with a plurality of mobile terminals comprises user profile information and mobile terminal location information.

14. The apparatus of claim 9, wherein the advertising message having identical content and including the monetary value is sent to the selected at least two mobile terminals with identical content.

15. The apparatus of claim 9, wherein the dynamically assigned monetary value is associated with a second criterion.

16. The apparatus of claim 9, wherein the dynamically assigned monetary value is associated with an electronic coupon.

17. A computer readable storage medium carrying one or more sequences of one or more instructions which, when executed by one or more processors, cause an apparatus to at least perform the following steps:
   receiving information associated with at least one advertising campaign including at least one specific criterion;
   receiving information associated with a plurality of mobile terminals;
   selecting at least two of the plurality of mobile terminals using the at least one specific criterion;
   creating an advertising message to be sent to the selected at least two mobile terminals, the advertising message including a monetary value dynamically generated based on the at least two of the plurality of mobile terminals selected using the at least one specific criterion to receive the advertising message; and
   transmitting the advertising message with the monetary value to the selected at least two mobile terminals.

18. The computer readable storage medium of claim 17, wherein the at least one specific criterion comprises the number of mobile terminals in a specific location.

19. The computer readable storage medium of claim 17, wherein the at least one specific criterion comprises profiles of the selected at least two mobile terminals.

20. The computer readable storage medium of claim 17, wherein the at least one specific criterion comprises the number of mobile terminals in a specific location and profiles of the selected at least two mobile terminals.

21. The computer readable storage medium of claim 17, wherein receiving information associated with a plurality of mobile terminals further comprises receiving user profile information and mobile terminal location information.

22. The computer readable storage medium of claim 17, wherein the advertising message having identical content and including the monetary value is sent to the selected at least two mobile terminals with identical content.

23. The computer readable storage medium of claim 17, wherein the computer executable instructions, when executed, determine the monetary value using a second criterion.

24. The computer readable storage medium of claim 17, wherein the monetary value is associated with in an electronic coupon.

* * * * *